US010197765B2

(12) United States Patent
Schulz

(10) Patent No.: US 10,197,765 B2
(45) Date of Patent: Feb. 5, 2019

(54) SYSTEM AND METHOD FOR POSITIONING A MIRROR IN A LIDAR SYSTEM USING OPEN LOOP AND CLOSED LOOP CONTROL

(71) Applicant: Digital Signal Corporation, Chantilly, VA (US)

(72) Inventor: Stephan Schulz, Bethesda, MD (US)

(73) Assignee: StereoVision Imaging, Inc., Pasadena, CA (US)

( * ) Notice: Subject to any disclaimer, the term of this patent is extended or adjusted under 35 U.S.C. 154(b) by 0 days.

(21) Appl. No.: 15/581,081

(22) Filed: Apr. 28, 2017

(65) Prior Publication Data

US 2018/0074286 A1     Mar. 15, 2018

Related U.S. Application Data

(63) Continuation of application No. 13/956,961, filed on Aug. 1, 2013.

(Continued)

(51) Int. Cl.
*G02B 7/182*     (2006.01)
*G01S 7/48*      (2006.01)
(Continued)

(52) U.S. Cl.
CPC .............. *G02B 7/182* (2013.01); *G01S 7/4812* (2013.01); *G01S 7/4817* (2013.01); *G01S 7/497* (2013.01); *G01S 17/023* (2013.01)

(58) Field of Classification Search
CPC ...... G01S 17/023; G01S 7/497; G01S 7/4812; G01S 7/4817; G02B 7/182
See application file for complete search history.

(56) References Cited

U.S. PATENT DOCUMENTS 5,216,729 A * 6/1993 Berger ................. G02B 6/4212
                                                  385/31
6,754,255 B1 * 6/2004 Yano .................... H04B 1/7073
                                                  375/149
(Continued)

FOREIGN PATENT DOCUMENTS

DE          102008039400      * 2/2010

*Primary Examiner* — Akm Enayet Ullah
(74) *Attorney, Agent, or Firm* — Toering Patents PLLC

(57) ABSTRACT

According to various implementations of the invention, a system for controlling a controlled device includes a lidar configured to direct at least one beam toward a target; a first controlled device, wherein the at least one beam is directed toward the target via the first controlled device; and a control system configured to control a position of the first controlled device, where the control system includes an open loop controller and a closed loop controller. The open loop controller is configured to receive a desired trajectory command signal, and generate an open loop drive signal based on the desired trajectory command signal. The closed loop controller is configured to receive an actual position signal of the first controlled device, and generate a closed loop drive signal based on the actual position signal and a control signal derived from the command signal, where the control signal accounts for group delays associated with one or more control system components. A combined drive signal is generated by combining the open loop drive signal and the closed loop drive signal. The combined drive signal is provided to control the position of the first controlled device.

12 Claims, 14 Drawing Sheets

Related U.S. Application Data

(60) Provisional application No. 61/678,147, filed on Aug. 1, 2012.

(51) Int. Cl.
    *G01S 17/02* (2006.01)
    *G01S 7/481* (2006.01)
    *G01S 7/497* (2006.01)

(56) References Cited

U.S. PATENT DOCUMENTS

| | | | | |
|---|---|---|---|---|
| 7,739,823 B2* | 6/2010 | Shapira | ............. | F41G 1/44 |
| | | | | 42/114 |
| 8,179,521 B2* | 5/2012 | Valla | ............. | G01F 1/661 |
| | | | | 356/5.01 |
| 8,717,545 B2* | 5/2014 | Sebastian | ............. | G01C 11/02 |
| | | | | 356/4.01 |
| 8,948,497 B2* | 2/2015 | Sebastian | ............. | G06T 5/003 |
| | | | | 345/419 |
| 9,293,971 B2* | 3/2016 | Benbouzid | ............. | H02P 31/00 |
| 2009/0153083 A1* | 6/2009 | Rozman | ............. | H02P 23/14 |
| | | | | 318/400.06 |
| 2009/0268326 A1* | 10/2009 | Shelor | ............. | G11B 5/455 |
| | | | | 360/31 |
| 2010/0243916 A1* | 9/2010 | Maurer | ............. | G01J 3/02 |
| | | | | 250/459.1 |

\* cited by examiner

SYSTEM AND METHOD FOR POSITIONING
A MIRROR IN A LIDAR SYSTEM USING
OPEN LOOP AND CLOSED LOOP CONTROL

CROSS-REFERENCE TO RELATED
APPLICATIONS

This Application is a continuation of U.S. patent application Ser. No. 13/956,961, which was filed on Aug. 1, 2013; which in turn claims priority to U.S. Provisional Patent Application No. 61/678,147, which was filed on Aug. 1, 2012. Each of the foregoing applications is incorporated herein by reference in its entirety.

FIELD OF THE INVENTION

The invention is generally related to control systems, and more particularly to, increasing tracking bandwidth in control systems.

BACKGROUND OF THE INVENTION

Control systems are employed in many applications where the input to a subsystem (referred to as the "plant" herein) has to be generated such that its output (one or more physical, measurable quantities) follows a desired value over time, even in the presence of disturbing influences on the subsystem. This desired value of the system output represents the input to the entire control system and is referred to as "desired system output" or in the description of an implementation example as "command position signal" herein.

The generation of the controlling input signal to the plant can be optimized to generate the desired output with high bandwidth, low error or some other optimization criterion. At the same time, it may be desirable to optimize suppression of disturbing influences on the plant. Optimization for more than one of these criteria can generally not be achieved and the resulting implementation necessarily represents a compromise.

Control systems are typically implemented in a closed-loop configuration where the output of the subsystem to be controlled is measured and compared to a desired system output. The difference between desired and measured system output constitutes the "error", which is used to generate the input to the controlled subsystem.

The use of a measure of the system output signal to generate the controlling input to the plant creates a signal-flow loop. Systems containing such loops are subject to stability limits, i.e. the components of the loop have to satisfy certain criteria to ensure stability of the loop and thus controllability of the system. These criteria impose additional constraints on the optimization of the system implementation.

What is needed are systems and methods for improving control system bandwidth that do not constrain optimization for the other criteria mentioned and do not affect the stability of the closed-loop system.

SUMMARY OF THE INVENTION

Various implementations of the invention include systems and methods for improving control system bandwidth (in a three dimensional system, for example). In some implementations, the control system bandwidth is improved without affecting the optimization for any of the other criteria (for example, minimizing error, suppression of disturbing influences (loop disturbances) on the plant, or other optimization criteria).

In some implementations, a first control signal in the control system is generated from the desired system output. The first control signal is provided as input to the plant. In some implementations, the first control signal is generated from the desired system output but not the measured system output.

In some implementations, a second control signal in the control system is generated from the desired system output. In some implementations, the control system is configured to use the second control signal to generate the "error" signal (indicative of the difference between the second control signal and the measured system output.

These implementations, their features and other aspects of the invention are described in further detail below.

DETAILED DESCRIPTION

Figure 1:
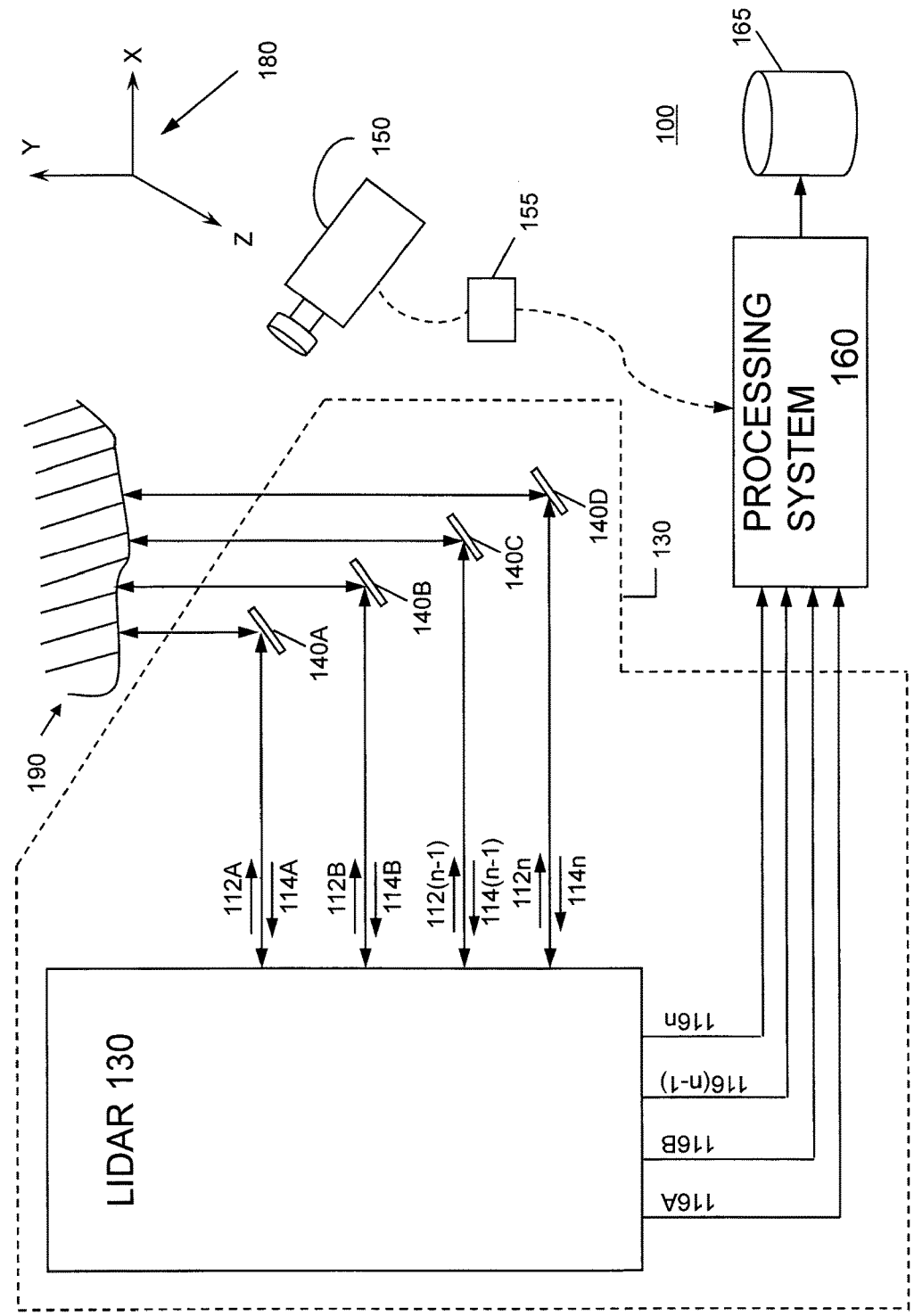
FIG. 1 illustrates a combined lidar and video camera system according to various implementations of the invention.

FIG. 1 illustrates a combined lidar and video camera system 100 (three dimensional system 100) according to various implementations of the invention. Various implementations of the invention utilize synergies between lidar measurements and video images to resolve six degrees of freedom for motion of a target to a degree not otherwise possible with either a lidar or video camera alone.

Combined system 100 includes a lidar subsystem 130, a video subsystem 150, and a processing system 160. As illustrated, lidar subsystem 130 includes two or more lidar beam outputs 112 (illustrated as a beam 112A, a beam 112b, a beam 112(n−1), and a beam 112n); two or more reflected beam inputs 114 each corresponding to one of beams 112 (illustrated as a reflected beam 114A, a reflected beam 114B, a reflected beam 114(n−1), and a reflected beam 114n); two or more lidar outputs 116 each associated with a pair of beam 112/reflected beam 114 (illustrated as a lidar output 116A associated with beam 112A/reflected beam 114A, a lidar output 116b associated with beam 112B/reflected beam 114B, a lidar output 116(n−1) associated with beam 112(n−1)/reflected beam 114(n−1), and a lidar output 116n associated with beam 112n/reflected beam 114n).

In some implementations of the invention, beam steering mechanism 140 may be employed to steer one or more beams 112 toward target 190. In some implementations of the invention, beam steering mechanism 140 may include individual steering mechanisms, such as a steering mechanism 140A, a steering mechanism 140B, a steering mechanism 140C, and a steering mechanism 140D, each of which independently steers a beam 112 toward target 190. In some implementations of the invention, one beam steering mechanism 140 may independently steer pairs or groups of beams 112 toward target 190.

In some implementations of the invention, beam steering mechanism 140 may include one or more mirrors, each of which may or may not be separately controlled, each mirror steering one or more beams 112 toward target 190. In some implementations of the invention, beam steering mechanism 140 may directly steer an optical fiber of beam 112 without use of a mirror. In some implementations of the invention, beam steering mechanism 140 may be controlled to steer beams 112 in azimuth and/or elevation. Various techniques may be used by beam steering mechanism 140 to steer beam(s) 112 toward target 190 as would be appreciated.

In some implementations of the invention, beam steering mechanism 140 may be used to control both an azimuth angle and an elevation angle of two beams 112 toward the target. By controlling both the azimuth angle and the elevation angle, the two beams 112 may be used to scan a volume for potential targets or track particular targets such as target 190. Other scanning mechanisms may be employed as would be apparent. In some implementations of the invention, the two beams 112 may be offset from one another. In some implementations of the invention, the two beams 112 may be offset vertically (e.g., in elevation) or horizontally (e.g., in azimuth) from one another by a predetermined offset and/or a predetermined angle, either of which may be adjustable or controlled.

As an example for an implementation of the invention, beam steering mechanism 140 may be used to control both an azimuth angle and an elevation angle and employ an implementation of the invention as a control algorithm to achieve high tracking bandwidth.

A certain portion of each beam 112 may be reflected back from target 190 to lidar subsystem 130 as reflected beam 114. In some implementations of the invention and as illustrated in FIG. 1, reflected beam 114 follows the same optical path (though in reverse) as beam 112. In some implementations of the invention, a separate optical path may be provided in lidar subsystem 130 or in combined system 100 to accommodate reflected beam 114.

In some implementations of the invention, lidar subsystem 130 receives a reflected beam 114 corresponding to each beam 112, processes reflected beam 114, and outputs lidar output 116 to processing system 160.

Combined system 100 also includes video subsystem 150. Video subsystem 150 may include a video camera for capturing two dimensional images 155 of target 190. Various video cameras may be used as would be apparent. In some implementations of the invention, the video camera may output images 155 as pixels at a particular resolution and at a particular image or frame rate. Video images 155 captured by video subsystem 150 are forwarded to processing system 160. In some implementations of the invention, lidar subsystem 130 and video subsystem 150 are offset from one another in terms of position and orientation. In particular, lidar measurements typically correspond to three dimensions (e.g., x, y, and z) whereas video images typically correspond to two dimensions (e.g., x and y). Various implementations of invention calibrate lidar subsystem 130 with video subsystem 150 to ensure that data provided by each system refers to the same location in a given coordinate system as would be apparent. Combined system 110 may include one or more optional video subsystems (not otherwise illustrated) for capturing additional two-dimensional images 155 of target 190 from different positions, perspectives or angles as would be apparent.

In some implementations of the invention, processing system 160 receives lidar outputs 116 from lidar subsystem 130 and images 155 from video subsystem 150 and stores them in a memory or other storage device 165 for subsequent processing. Processing system 160 processes lidar outputs 116 and images 155 to generate a three-dimensional image of target 190. In some implementations of the invention, processing system 160 determines a trajectory of target 190 from a combination of lidar outputs 116 and images 155 and uses the trajectory to generate a motion stabilized three-dimensional image of target 190, as described in co-pending U.S. application Ser. No. 12/710,057, entitled "System and Method for Generating Three Dimensional Images Using Lidar and Video Measurements", which is incorporated herein by reference in its entirety.

Figure 2:
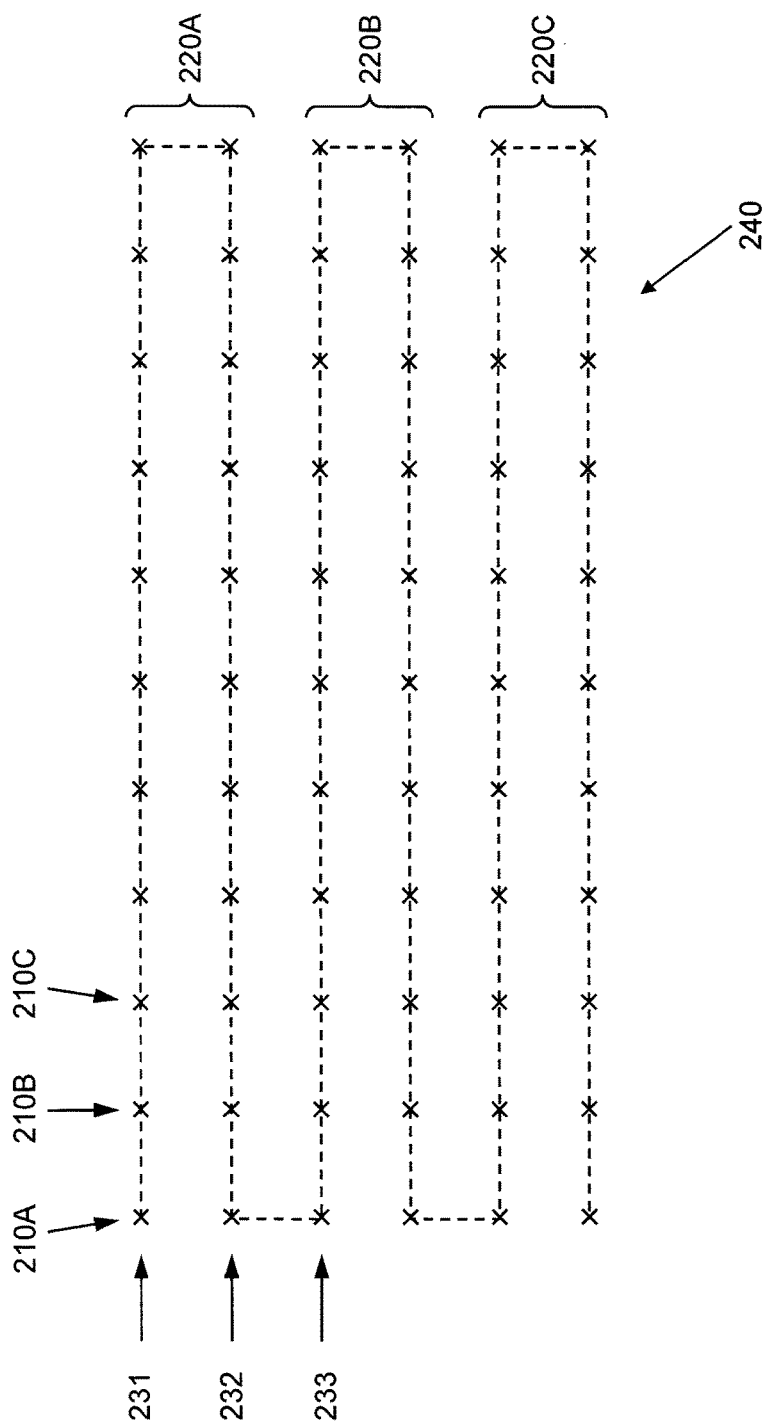
FIG. 2 illustrates a scan pattern of a lidar beam according to various implementations of the invention.

As illustrated in FIG. 2, in some implementations of a lidar system, a scan pattern 240 may be used to scan a volume for targets. For purposes of explanation, scan pattern 240 represents a pattern of measurements taken by a single beam. As illustrated, scan pattern 240 includes individual points 210 measured left to right in azimuth at a first elevation 231, right to left in azimuth at a second elevation 232, left to right in azimuth at a third elevation 233, etc., until a particular scan volume is scanned. In some implementations, scan pattern 240 may be divided into intervals corresponding to various timing aspects associated with combined system 100. For example, in some implementations of the invention, scan pattern 240 may be divided into time intervals associated with a frame rate of video subsystem 150. In some implementations of the invention, scan pattern 240 may be divided into time intervals associated with scanning a particular elevation (i.e., an entire left-to-right or right-to-left scan). In some implementations of the invention, scan pattern 240 may be divided into time intervals associated with a roundtrip scan 220 (illustrated in FIG. 2 as a roundtrip scan 220A, a roundtrip scan 220B, and a roundtrip scan 220C) at one or more elevations (i.e., a left-to-right and a return right-to-left scan at either the same or different elevations). Similar timing aspects may be used in implementations that scan vertically in elevation (as opposed to horizontally in azimuth). Other timing aspects may be used as well. A single line of the scan pattern is used to illustrate the operation of a control system configured according to an implementation of the invention.

In some implementations, beam steering mechanism 140 may include a controller/control system that is configured to control a position (e.g., angle) of a steering mirror (also referred to herein as a controlled device or subsystem, i.e., a controlled device or subsystem that is to be controlled by the controller). In some implementations, the controller uses a combination of model-based open loop and closed loop control. While the controller is described herein as a controller that controls the steering mirror of a lidar subsystem 130, other devices or subsystems may be controlled by similar controllers implemented in accordance with the invention as would be appreciated. In some implementations, beam steering mechanism 140 may include a single controller configured to control all mirrors used. In some implementations, beam steering mechanism 140 may include a dedicated controller for each mirror.

Figure 3:
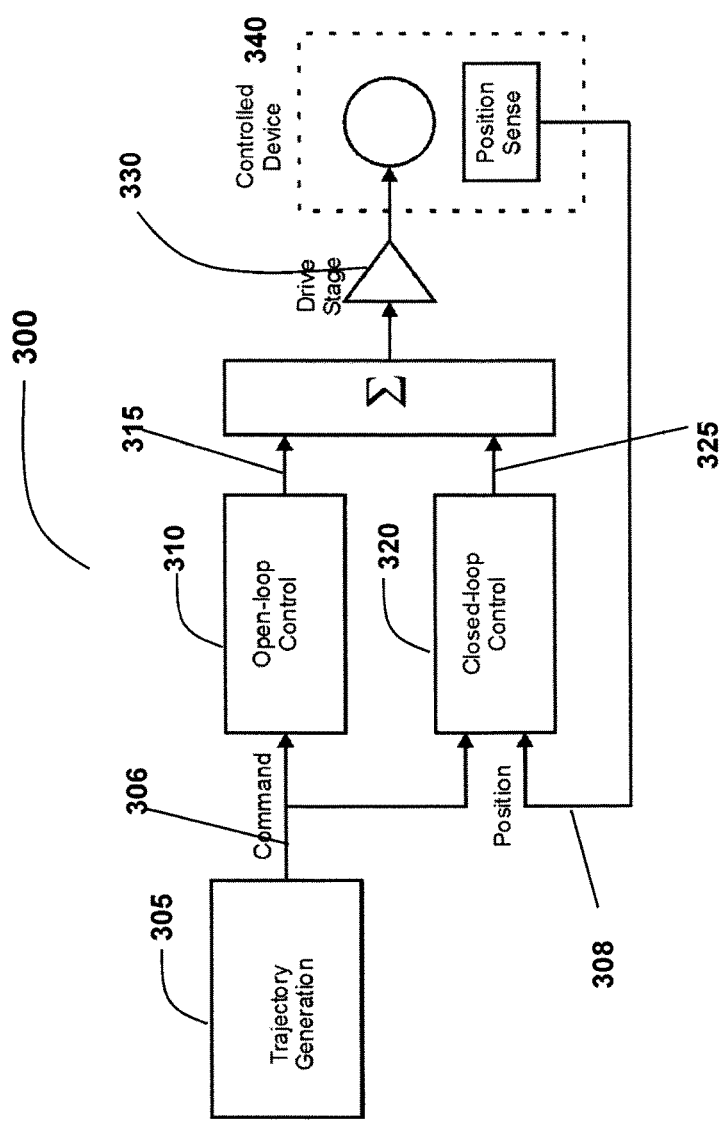
FIG. 3 illustrates a block diagram of a controller according to various implementations of the invention.

In some implementations, using an example of a one-dimensional displacement stage as the controlled device, a form of trajectory generation suitable for this type of control is derived. FIG. 3 illustrates a block diagram of a controller 300 used to control such a controlled device according to various implementations of the invention. In some implementations, the trajectory generation component 305 generates a desired trajectory command signal 306 that indicates desired positioning of the controlled device 340 over time (also referred to as command position signal 306 or desired system output 306). In some implementations, the command position signal 306 is input to the open loop control component 310 and the closed loop control component 320. In some implementations, open loop control component 310 may generate an open loop drive signal 315 and provide the open loop drive signal 315 to the drive stage 330. In some implementations, the closed loop control component 320 receives as input the command position signal 306 and an actual position output signal 308 (also, referred to as, the measured system output 308) from the controlled device 340. In some implementations, closed loop control component 320 may generate a closed loop drive signal 325 and provide the closed loop drive signal 325 to drive stage 330. The drive stage 330 may generate and provide a combined drive signal (combined open loop and closed loop drive signal) to controlled device 340 to control the position of the controlled device 340.

In some implementations, extension of the architecture described in FIG. 3 to a multi-dimensional controller and/or to implementation of a piece-wise linearization for devices with non-linear transfer functions will be apparent to those having skill in the art and are not described in further detail herein.

A continuous-time system and implementation have been described herein. However, in some implementations, extension to a discrete-time system and implementation may be achieved by one skilled in the art through replacing differential equations with difference equations and functional blocks of the implementation with their discrete-time equivalent functions as would be appreciated.

In some implementations, using the example of a one-dimensional displacement stage as shown in FIG. 3, the controlled device 340 may be described as a system with a single input signal, the "drive" signal drv(t), and a single output signal, the "position" signal pos(t). The dependence of the position signal from the applied drive signal is expressed as a transfer function T.

One of the classes of transfer functions allowing implementation with the controller structure described herein are ordinary linear differential equations with constant coefficients. For the purpose of illustration of an example of the invention, a plant/controlled device with a transfer function of this type is chosen, but the applicability of the invention is not limited to plants with transfer functions of this type. An example second-order system following equation 3 may be used:

$$c_3*\text{pos}''(t)+c_2*\text{pos}'(t)+c_1*\text{pos}(t)=\text{drv}(t) \quad \text{Eq. (3)}$$

where the prime denotes differentiation; pos'(t) is the derivative of pos(t) and pos''(t) is the second derivative. The steady-state system gain will be $1/c_1$ and the other terms describe the dynamic behavior of the system.

In some implementations, the goal of the controller is to make position pos(t) equal the command signal cmd(t):

$$\text{pos}(t)=\text{cmd}(t) \quad \text{Eq. (4)}$$

The appropriate drive signal to achieve this condition then becomes:

$$\text{drv}(t)=c_3*\text{cmd}''(t)+c_2*\text{cmd}'(t)+c_1*\text{cmd}(t) \quad \text{Eq. (5)}$$

Figure 4:
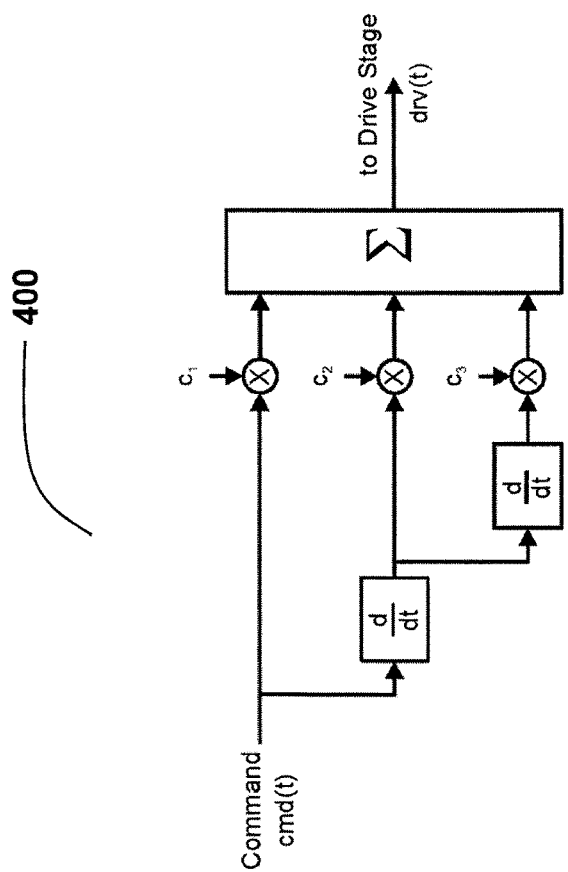
FIG. 4 illustrates a block diagram for open loop control for a second-order system according to various implementations of the invention.

FIG. 4 illustrates a block diagram 400 for open loop control for a second-order system according to various implementations of the invention. Block diagram 400 illustrates an implementation of the open loop control component 310 of FIG. 3. The open loop control component structure of FIG. 4 represents the differential equation (3). One of ordinary skill in the art would appreciate how to extend this structure to implement any other ordinary linear differential equations, be it of first, second or higher order.

In some implementations, a drive stage of a real, implementable system shows a limited range of output values beyond which saturation sets in and rate of change of the output (slew rate) is limited. The position output signal of a system driven according to equation (5) equals the desired trajectory cmd(t) if the drive stage behaves as linear element, i.e. saturation and slew rate limitation are avoided. This places constraints on the possible trajectories the open-loop system can accurately follow.

One approach consists of individually limiting the contributing summands of equation (5). For a second-order system as in the example, this means placing constraints on the maximum values of acceleration and velocity; maximum position cannot be exceeded no matter which control is applied. In case of a third-order system, the trajectory generation has to also control the third derivative of cmd(t), the "jerk", and so on for higher order systems.

Figure 5A:
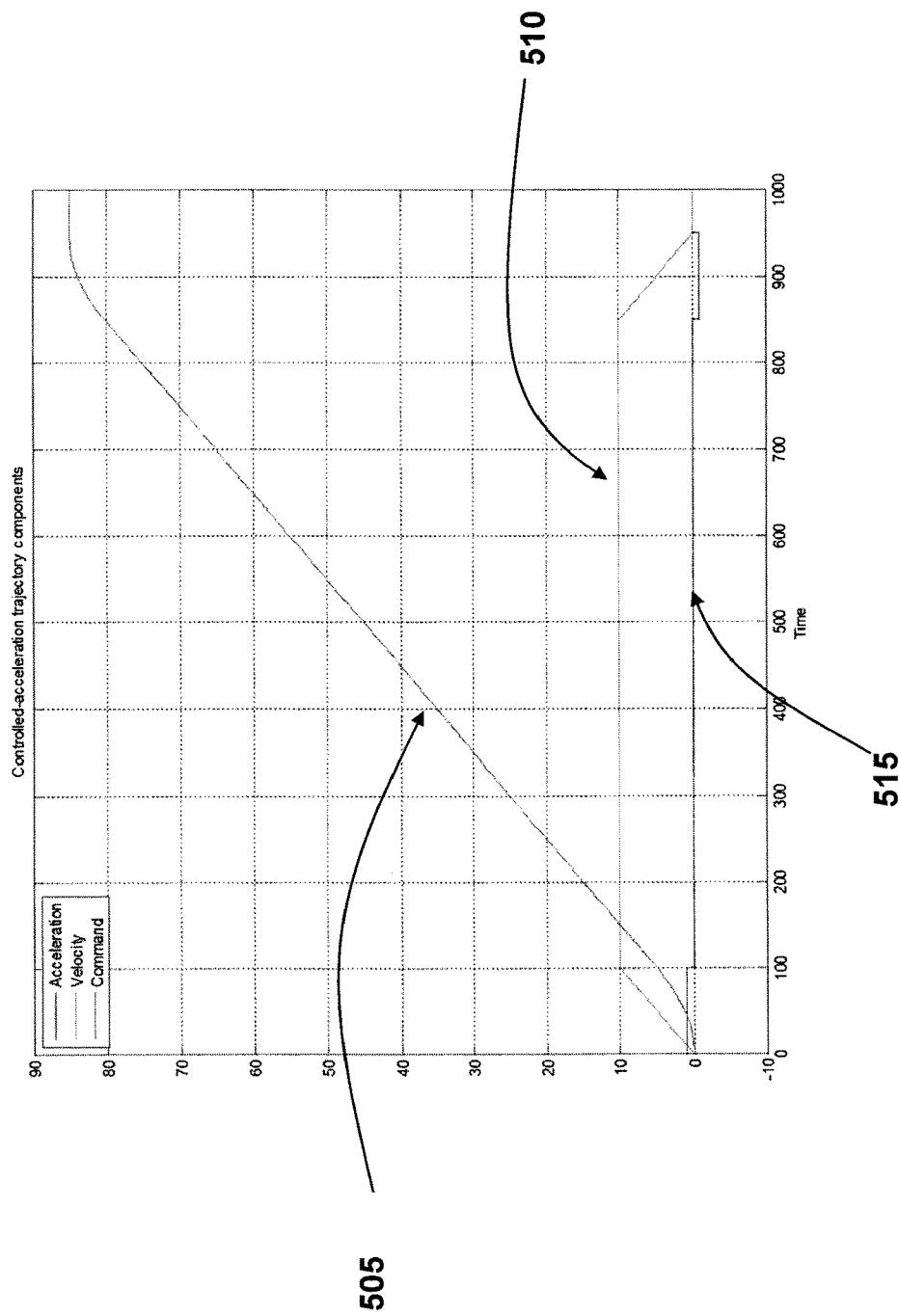
FIG. 5A illustrates components of controlled-acceleration trajectory for open loop control according to various implementations of the invention.
Figure 5B:
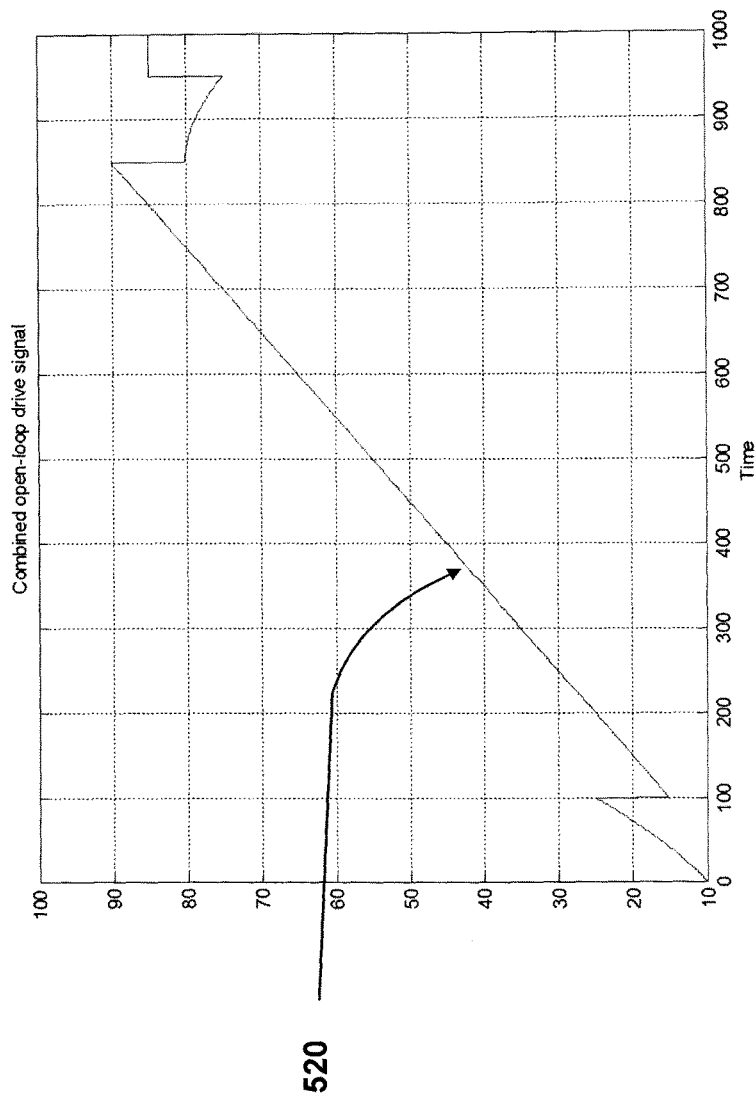
FIG. 5B illustrates an open loop drive signal according to various implementations of the invention.

In some implementations, the drive signal components (in the example of a single scan line) depend on the command signal following a controlled-acceleration trajectory. In some implementations, the second-order case of a simple linear movement with limited and constant acceleration results in a sigmoid trajectory. FIG. 5A illustrates components of this controlled-acceleration trajectory, for example, acceleration 515, velocity 510 and command 505. FIG. 5B illustrates the resulting open loop drive signal 520 generated with arbitrary coefficients.

Figure 6:
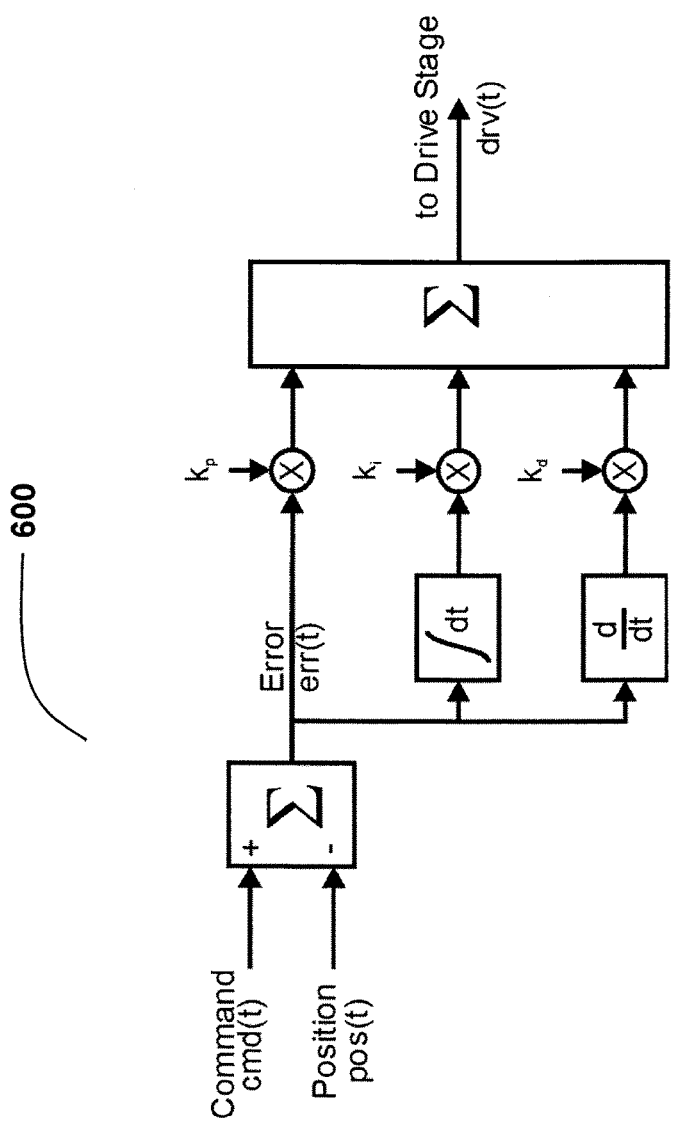
FIG. 6 illustrates a block diagram for an example controller using a PID algorithm according to various implementations of the invention.

FIG. 6 illustrates a block diagram 600 for closed loop control component 320 according to various implementations of the invention. In some implementations, the open loop control component 310 may show a difference between the command position signal (cmd(t)) and the actual position signal (pos(t)) due to inaccuracies in the controller itself and due to disturbances of the controlled device by external influences. In some implementations, closed loop control component 320 may generate a difference signal (i.e., error signal err(t)) based on the command position signal and the actual position signal and may drive the system such that the error signal is minimized.

In some implementations, the closed loop control component 320 may include a PID (proportional-integral-derivative) controller which is used to describe an example implementation of the invention. The invention may be applied to any other type of controller using the error signal as described to generate a controlling input signal to the plant/controlled device and is not limited to controllers of the PID type. In some implementations, the proportional, integral, and derivative of the error signal are combined to form the closed loop drive signal. In some implementations, stability analysis and derivation of the parameters ($k_r$, $k_i$ and $k_d$ in the case of a PID controller) are understood by one of ordinary skill in the art. In some implementations, the achievable bandwidth of the closed-loop system is limited by the stability requirement.

In some implementations, fast loop tuning is often accomplished by cancellation of poles in the transfer function of the open-loop system; this introduces a sensitivity of loop stability to parameter changes and drift.

Figure 7:
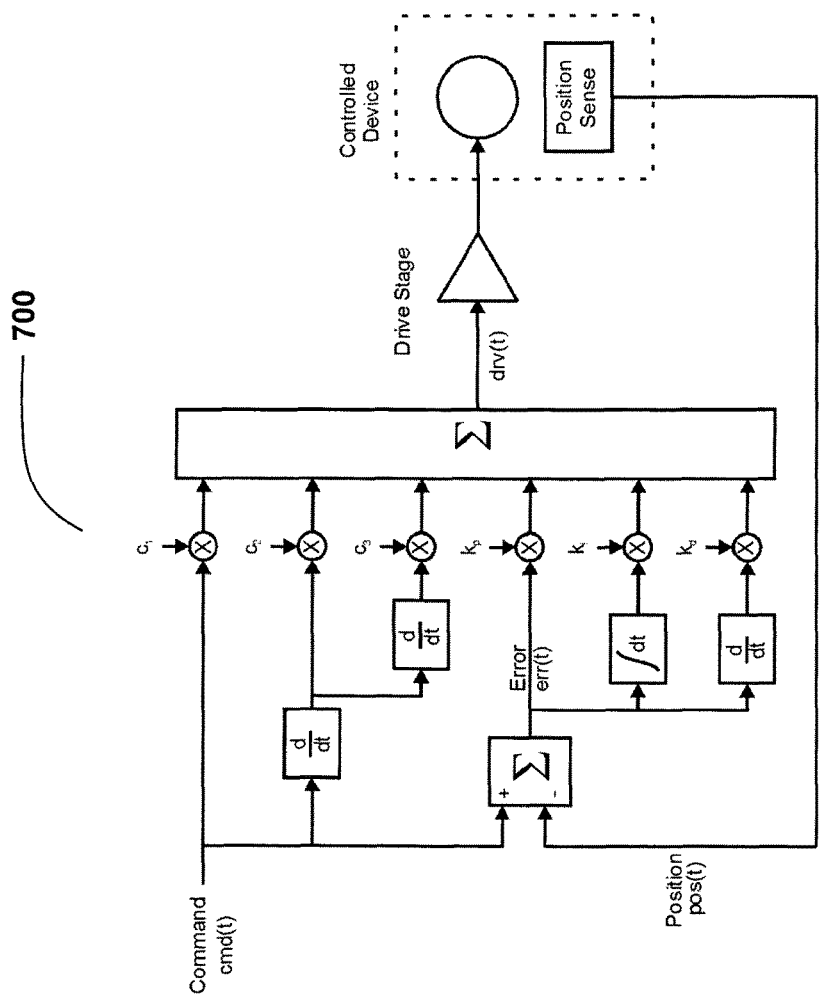
FIG. 7 illustrates a block diagram for a combined open loop and closed loop control according to various implementations of the invention.

FIG. 7 illustrates a block diagram 700 for a combined open loop and closed loop control according to various implementations of the invention. By combining both open loop and closed loop control the interdependence of control bandwidth and loop stability is removed. As long as a desired trajectory command signal does not saturate the drive stage, the control bandwidth depends only on the open-loop coefficients while the remaining positioning error is determined by the closed-loop tuning.

Figure 8:
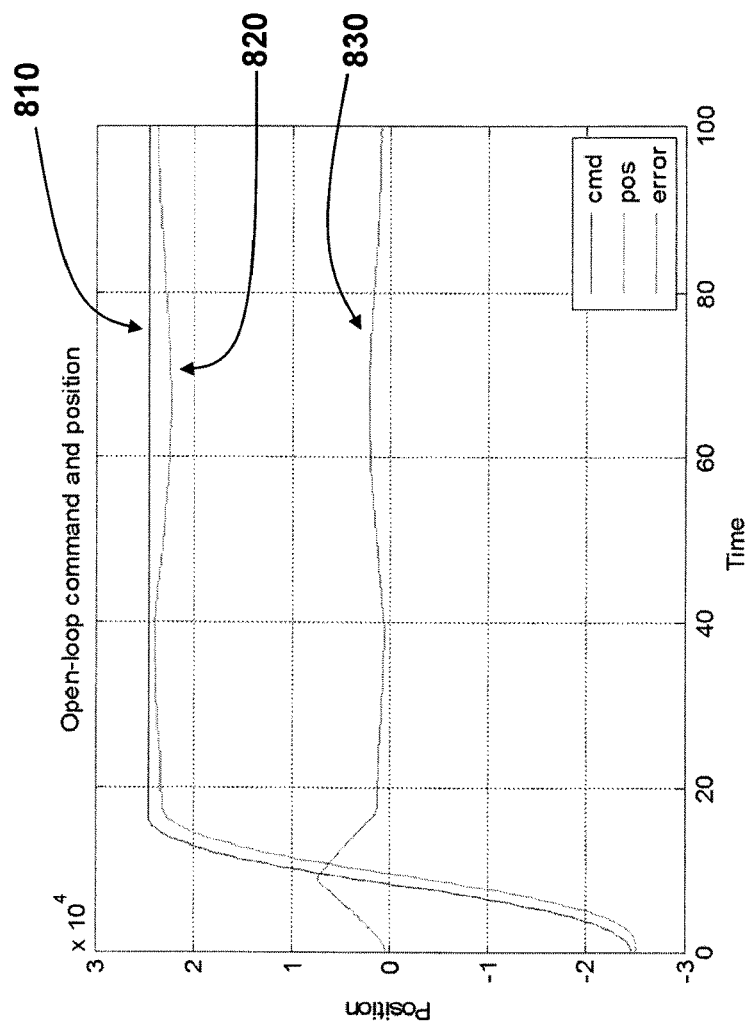
FIG. 8 illustrates an open loop system response according to various implementations of the invention.

In some implementations, the controlled device may exhibit a delay when following the commanded trajectory (i.e., desired trajectory command signal/command position signal). FIG. 8 illustrates an open loop system response of a second order system using open loop control according to various implementations of the invention. In some implementations, with a drive signal of equation (5), the controlled device may follow the commanded trajectory 810 accurately, but with a delay indicated by actual position signal 820 (which is indicative of system response). The resulting error signal 830 (command minus actual) may not be used in the open loop control component, but may be provided as input to the closed loop control component of FIG. 7. This resulting error signal may cause the closed loop control component of the controller to contribute to the drive signal, thus affecting dynamic behavior of the system.

Figure 9:
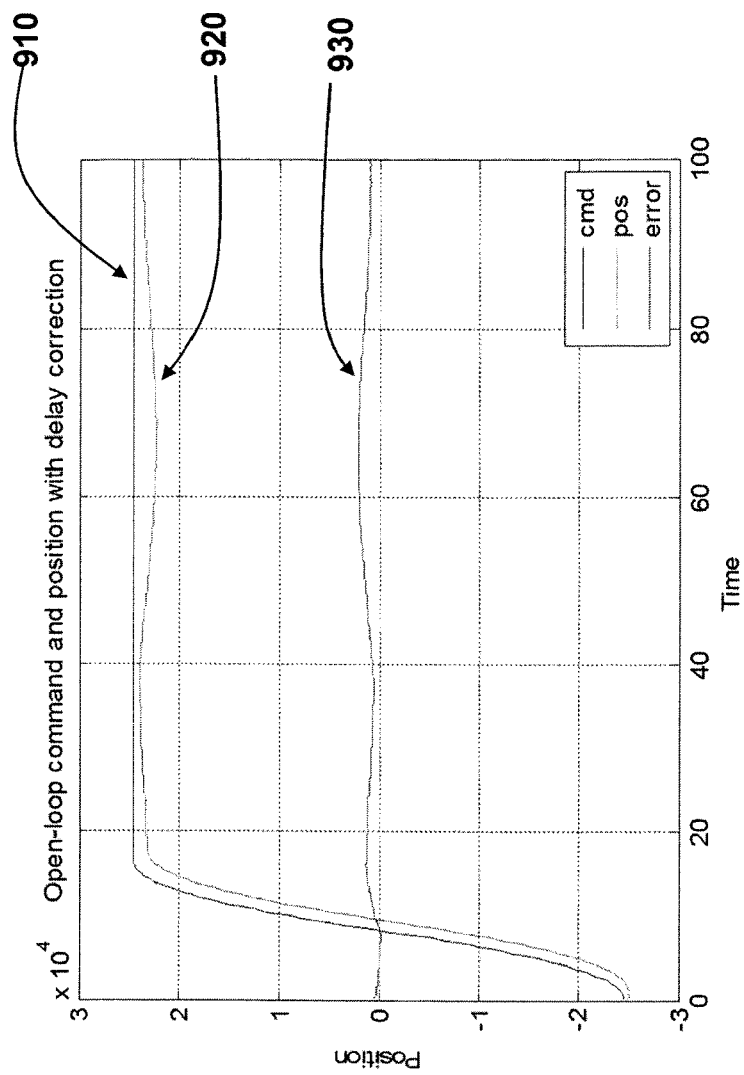
FIG. 9 illustrates an open loop system response with a delay-corrected error signal according to various implementations of the invention.

In some implementations, by accounting for the system delay in the architecture of the controller, the error signal input to the closed loop control component may be generated as the difference of ideal system response and actual system response. In some implementations, the ideal system response may be the command position signal delayed by an expected system delay. FIG. 9 illustrates an open loop system response with a corrected error signal 930 according to various implementations of the invention.

Figure 10:
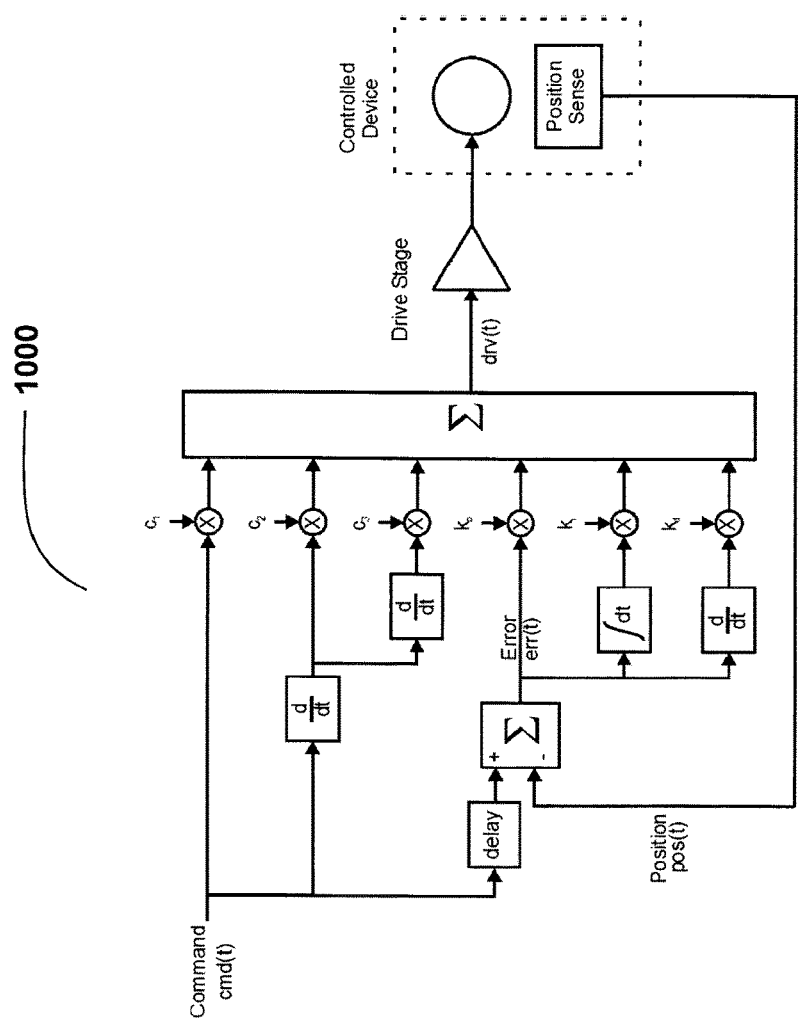
FIG. 10 illustrates a block diagram for a combined open loop and closed loop control with delayed error signal according to various implementations of the invention.

FIG. 10 illustrates a block diagram 1000 for a combined open loop and closed loop control with corrected error signal generated from actual system response and delayed command signal according to various implementations of the invention. In some implementations, a corrected error signal is input to the closed loop control component. The resulting error is treated as a system disturbance and the closed loop control component of the controller may be optimized for load disturbances without impacting the system response to command inputs (tracking performance). Since the corrected error does not cause the closed loop control component to significantly contribute to the tracking performance, system tracking bandwidth may be determined by the open-loop coefficients without stability constraints.

Figure 11:
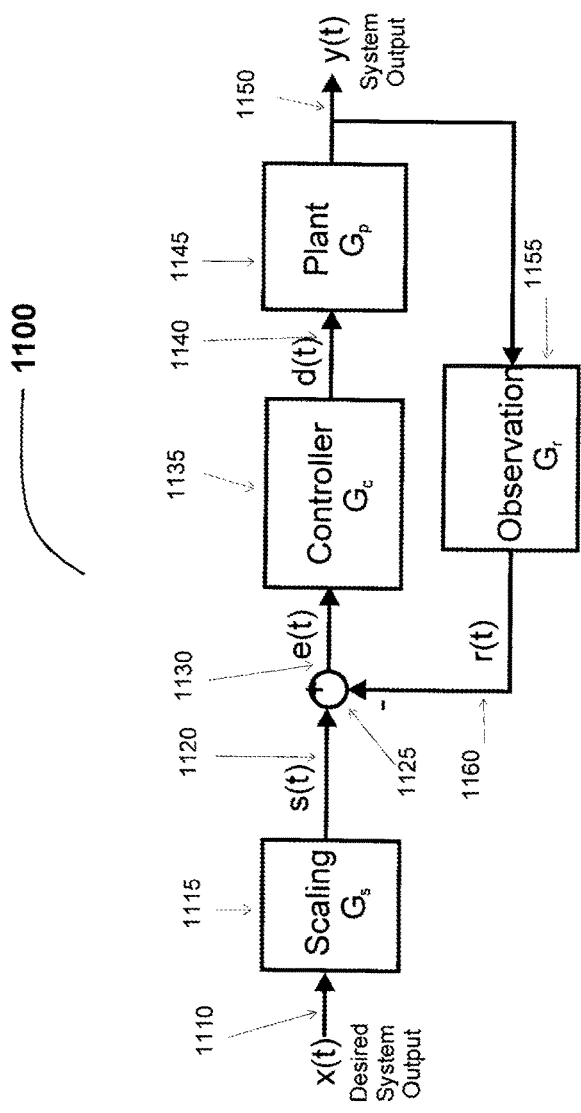
FIG. 11 illustrates a block diagram of a conventional closed-loop controller/control system.
Figure 12:
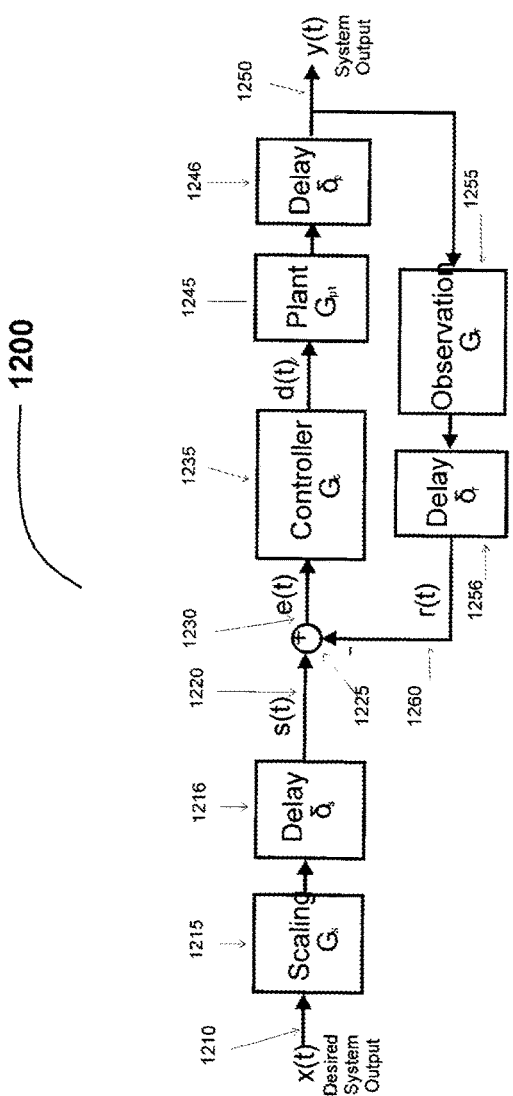
FIG. 12 illustrates a block diagram of a conventional closed-loop controller/control system wherein the representation of one or more component blocks is partitioned into a minimum-phase transfer function and a delay.

FIGS. 11 and 12 illustrate generalized block diagrams of a conventional closed-loop controller/control system. In some implementations, the behavior of the individual blocks may best be represented with a continuous-time transfer function. In some other implementations, a discrete-time, sampled representation may be used. In yet other implementations, a combination of these methods may be used.

The concept of a transfer function is applied to the individual system components to create a characterization of the combination of these components as a linear system. A transfer function is the quotient of output signal of a component divided by the input signal of that component, using an appropriate transform description, such as Laplace transform, z-transform, or any other applicable transform descriptions. In the case of non-linear transfer function of one or more components, a linear approximation of that transfer function at a certain operating point may be used.

In some implementations, a multitude of system output signals is generated from a multitude of internal signals and, ultimately, from a multitude of desired system output signals. For these implementations, the individual signals described herein each consist of a multitude of signals. In the mathematical description, transfer functions are then replaced with transfer matrices, as appropriate. The invention applies equally to these types of systems using the mentioned extended notation without other changes.

In some implementations, FIG. 11 illustrates a conventional closed-loop control system 1100. In some implementations, the controlled device or system includes plant 1145 with its input signal 1140, d(t) (the "drive signal"), generating the system output signal 1150, y(t) (measured system output). The system output is observed by block 1155, generating signal 1160, r(t) (the "feedback" signal). This feedback signal 1160 is subtracted from signal 1120 using adder block 1125 with the inversion of signal 1160 indicated by the "-" sign at the corresponding input to the adder 1125. The difference signal 1130, e(t) (the "error" signal), is an indication for how much the measured system output 1150 deviates from the desired system output 1110. This error signal 1130 is used by the controller 1135 to create a corrected input signal 1140 which is provided as input to the plant 1145.

The desired system output 1110, x(t), is fed through a scaling block 1115 to generate signal 1120, s(t). In some implementations, this scaling block is used to apply an operation similar to the transfer function of the observation block 1155. For these implementations, the desired system output 1110 and the measured system output 1150 are directly comparable and of the same scaling. For other implementations, the transfer function of scaling block 1115 differs from the observation block 1155 in that the desired system output 1110 is of different scaling as compared to the measured system output 1150. For the remainder of the description of the invention, it is assumed that the desired system output 1110 has the same scaling as the measured system output 1150. For implementations where the desired system output 1110 has a different scaling as compared to the measured system output 1150, an additional scaling may be applied to the system input to create signal 1110 with scaling identical to the measured system output 1150 without departing from the scope of the invention.

The transfer function of the control system in FIG. 11 is given by:

$$\frac{y(t)}{x(t)} = \frac{Gs * Gc * Gp}{1 + Gr * Gc * Gp} \qquad \text{Eq. (6)}$$

In an ideal case, the measured system output 1150 y(t) follows the desired system output 1110 x(t) identically, which means that the transfer function of such an ideal system would be equal to 1. Practical implementations of such ideal systems will nonetheless show a delay from system input 1110 to its output 1150; therefore, the best case of a system transfer function is the identity transfer function with this delay. Various implementations of the invention attempt to achieve this "best case".

FIG. 12 illustrates an extension of the conventional control system of FIG. 11. In this system, the representation of one or more component blocks is partitioned into a minimum-phase transfer function and a delay. As discussed above, practical implementations of such systems exhibit a delay. The delay blocks exhibit a frequency-dependent group delay. In the case of the "plant" and "observation" blocks this delay is chosen such that the cascade of transfer function and delay accurately represents the system behavior. For the other blocks the separation into minimum-phase transfer function and delay serves as a reminder that not only a certain amplitude response of the individual system components has to be achieved by the control system implementation but also the resulting group delays have to be taken into account.

In some implementations, the plant block may be represented as a cascade of a minimum-phase plant function 1245 and a delay 1246. Similarly, the scaling block is represented as minimum-phase scaling 1215 followed by delay 1216 and the observation block is represented as a minimum-phase observation function 1255 followed by delay 1256. The signal flow and associated description provided with respect to FIG. 11 applies to FIG. 12 without further changes.

The transfer function of the control system in FIG. 12 is given by:

$$\frac{y(t)}{x(t)} = \frac{Gs * \delta s * Gc * Gp * \delta p}{1 + Gr * \delta r * Gc * Gp * \delta p} \qquad \text{Eq. (7)}$$

The block transfer functions Gs, Gp and Gr in this equation are the minimum-phase versions of the block transfer functions Gs, Gp and Gr used in the system transfer function given for the control system of FIG. 11. δs, δp and δr represent the delays 1216, 1246, and 1256, respectively.

Figure 13:
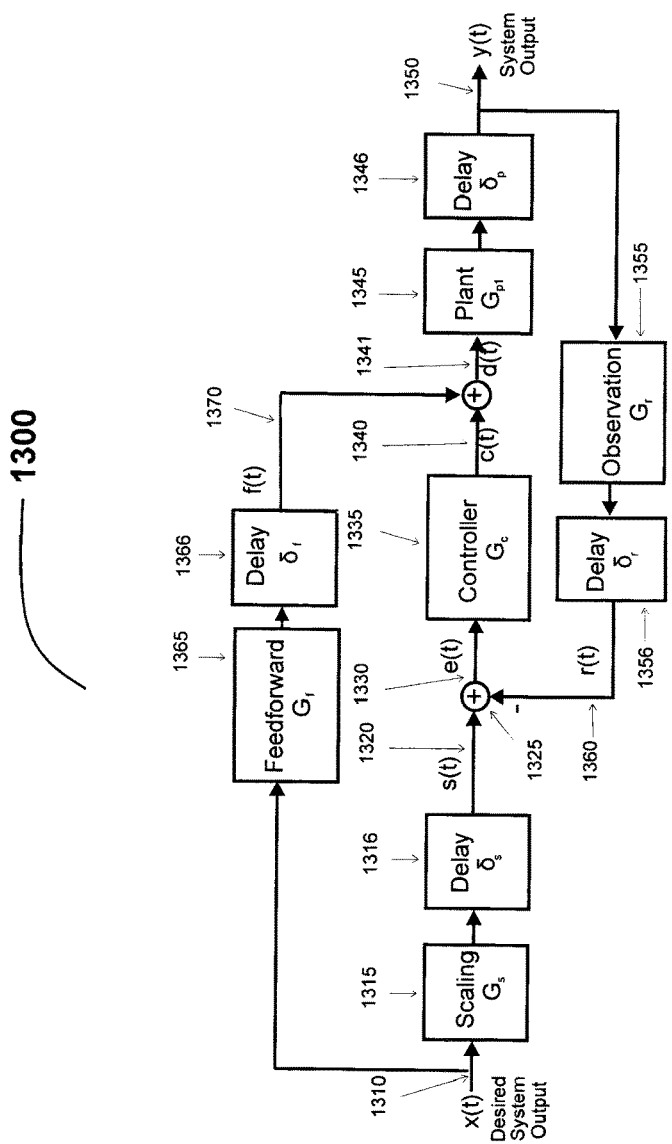
FIG. 13 illustrates a block diagram of a combined controller/control system according to various implementations of the invention.

FIG. 13 illustrates a block diagram of a combined controller/control system according to various implementations of the invention. The combined controller uses a combination of open loop and closed loop control. In some implementations, the control system of FIG. 13 includes a feed forward path (represented by block 1365 and delay 1366) that is added to the control system of FIG. 12 to generate a "drive" signal component d(t) directly derived from the desired system output x(t). The feed forward signal f(t) 1370 is generated from the desired system output and provided as input to plant 1345. In some implementations, knowledge of the plant transfer function Gp creates a system output y(t) that closely follows the desired system output x(t).

In some implementations, a control signal s(t) 1320 is generated from the desired system output 1310. In some implementations, the control system is configured to use the control signal s(t) to generate the "error" signal e(t) 1330 (indicative of the difference between the control signal s(t) and the measured system output r(t)). The control signal s(t) accounts for group delays associated with one or more control system components (for example, group delays associated with the cascade of Gf, δf, Gp, δp, Gr and δr). In some implementations, the control system is configured to add corrections for the group delays of the various control system components to achieve the desired degree of independence of tracking performance from the closed-loop part of the controller implementation.

In some implementations, the control system generates a corrected control signal c(t) 1340 based on the error signal e(t). The corrected control signal c(t) and the feed forward signal f(t) are provided as inputs to the plant 1345, thereby controlling the plant.

The transfer function of the control system in FIG. 13 is given by:

$$\frac{y(t)}{x(t)} = \frac{Gf * \delta f * Gp * \delta p + Gs * \delta s * Gc * Gp * \delta p}{1 + Gr * \delta r * Gc * Gp * \delta p} \qquad \text{Eq. (8)}$$

The transfer function for Gf is chosen as a direct inversion of the plant transfer function Gp:

$$Gf = 1/Gp. \qquad \text{Eq. (9)}$$

The implementation of this inversion shows a group delay which cannot become negative due to the required causality of any implementation. δf is chosen such that the cascade of Gf and δf shows a particular, frequency-dependent delay, thus absorbing the fact that the inversion of Gp will invert the amplitude response vs. frequency for a given plant but may not create negative group delays. The system transfer function then becomes:

$$\frac{y(t)}{x(t)} = \frac{\delta f * \delta p + Gs * \delta s * Gc * Gp * \delta p}{1 + Gr * \delta r * Gc * Gp * \delta p} \qquad \text{Eq. (10)}$$

The product δf*δp describes a block with an amplitude transfer function of unity and a delay equal to the sum of the delays of Gf and Gp.

The transfer function Gs of the scaling block can be made equal to the transfer function of the observation block:

$$Gs = Gr. \qquad \text{Eq. (11)}$$

In conjunction with multiplying both numerator and denominator with δf*δp, the system transfer function changes to:

$$\frac{y(t)}{x(t)} = \frac{\delta f * \delta p * (\delta f * \delta p + \delta s * Gr * Gc * Gp * \delta p)}{\delta f * \delta p + \delta f * \delta p * \delta r * Gr * Gc * Gp * \delta p} \qquad \text{Eq. (12)}$$

Further, the following is chosen:

$$\delta s = \delta f * \delta p * \delta r \qquad \text{Eq. (13)}$$

with the resulting system transfer function becoming an identity transfer function with a delay from the system input to its output (as mentioned above):

$$\frac{y(t)}{x(t)} = \delta f * \delta p \qquad \text{Eq. (14)}$$

The condition that δs be made equal to δf*δp*δr means that the implementation of the cascade of Gs and δs shows the same group delay as the cascade of Gf, δf, Gp, δp, Gr and δr.

In some implementations, the design choices expressed in equations 9, 11 and 13 do not have to be implemented perfectly; the increase in tracking performance of the controlled system can be realized with approximations of one or more of these design choices. As an example, the group delay δs of block Gs as calculated in equation 13 may be approximated with a fixed, frequency-independent delay without regard to the frequency-dependent nature of system group delays. Similarly, the inversion of transfer function Gp in equation 9 may be approximated, especially in cases where the implementation of a perfect inversion is not feasible. The quality and nature of these approximations determine the degree to which the benefits of the invention can be realized.

As the derivation of the resulting system transfer function shows, the implementation and properties of the controller Gc are not relevant to achieving the optimum transfer function for the tracking behavior of the loop, given by y(t)/x(t). The actual type of controller is also not relevant to the applicability of this invention; the controller can be of the PID type, or a state space implementation or any other, appropriate implementation using the error signal as described to generate an input signal to the plant. Similarly, the design of the controller Gc does not have to optimize or at least preserve a certain performance with respect to the tracking behavior and can be optimized to suppress loop disturbances, minimize long-term settling errors or any other criterion while ignoring the tracking performance of the conventional closed-loop controller.

The stability of the closed-loop system is determined by the design of the system controller Gc in the presence of Gp and Gr. The combined control system does not affect the closed-loop stability of the system and is independent of it.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A system for controlling a controlled device, the system comprising:
    a lidar configured to direct at least one beam toward a target, the lidar comprising a first controlled device and a control system,
    wherein the at least one beam of the lidar is directed toward the target via the first controlled device, and
    wherein the control system is configured to control a position of the first controlled device, wherein the control system comprises:
        an open loop controller configured to:
            receive a desired trajectory command signal, and
            generate an open loop drive signal based on the desired trajectory command signal, and
        a closed loop controller configured to:
            receive an actual position signal of the first controlled device, and
            generate a closed loop drive signal based on the actual position signal and a control signal derived from the command signal, wherein the control signal accounts for group delays associated with one or more control system components,
    wherein a combined drive signal is provided to control the position of the first controlled device, and wherein the combined drive signal is generated by combining the open loop drive signal and the closed loop drive signal.

2. The system of claim 1, wherein the first controlled device comprises a beam steering mechanism.

3. The system of claim 2, wherein the beam steering mechanism is configured to steer one or more mirrors.

4. The system of claim 2, wherein the beam steering mechanism is configured to steer one or more optical fiber tips.

5. A control system for controlling a controlled device, the control system configured to:
    generate a first control signal from a desired system output of the controlled device;
    generate a second control signal from the desired system output, wherein the second control signal accounts for group delays associated with one or more control system components;
    generate an error signal based on the second control signal and a measured system output of the controlled device;
    generating a corrected control signal based on the error signal; and
    providing the first control signal and the corrected control signal to the controlled device.

6. The system of claim 5, wherein the controlled device comprises a beam steering mechanism.

7. The system of claim 6, wherein the beam steering mechanism is configured to steer one or more mirrors.

8. The system of claim 6, wherein the beam steering mechanism is configured to steer one or more optical fiber tips.

9. A method for controlling a controlled device, the method comprising:
    receiving a command signal for a desired trajectory of the controlled device;
    generating an open loop drive signal for the controlled device based on the command signal;
    receiving an actual position signal of the controlled device;
    generating a closed loop drive signal based on the actual position signal and a control signal derived from the command signal, wherein the control signal accounts for group delays associated with one or more control system components;
    combining the open loop drive signal and the closed loop drive signal to form a combined drive signal; and
    applying the combined drive signal to the controlled device to control the position of the controlled device.

10. The method of claim 9, wherein receiving a command signal for a desired trajectory of the controlled device comprises receiving a command signal for a desired trajectory of a beam directed toward a target, wherein the beam is directed toward the target via a beam steering mechanism.

11. The method of claim 10, wherein the beam steering mechanism is configured to steer one or more mirrors that direct the beam toward the target.

12. The method of claim 10, wherein the beam steering mechanism is configured to steer one or more optical fiber tips that direct the beam toward the target.

\* \* \* \* \*